(12) United States Patent
Huang et al.

(10) Patent No.: US 10,285,079 B2
(45) Date of Patent: May 7, 2019

(54) NETWORK PARAMETER ADJUSTMENT METHOD, AND BASE STATION DEVICE

(71) Applicant: Huawei Technologies Co., Ltd., Shenzhen (CN)

(72) Inventors: Fan Huang, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/442,337

(22) Filed: Feb. 24, 2017

(65) Prior Publication Data
US 2017/0164219 A1    Jun. 8, 2017

Related U.S. Application Data

(63) Continuation of application No. PCT/CN2014/085637, filed on Aug. 30, 2014.

(51) Int. Cl.
| | |
|---|---|
| *H04W 24/02* | (2009.01) |
| *H04L 12/24* | (2006.01) |
| *H04W 16/32* | (2009.01) |
| *H04W 24/00* | (2009.01) |

(52) U.S. Cl.
CPC ......... *H04W 24/02* (2013.01); *H04L 41/0813* (2013.01); *H04L 41/0823* (2013.01); *H04L 41/30* (2013.01); *H04W 16/32* (2013.01); *H04W 24/00* (2013.01)

(58) Field of Classification Search
CPC ..... H04W 24/02; H04W 16/32; H04W 24/00; H04L 41/30; H04L 41/0813; H04L 41/0823

USPC ............ 455/419; 370/252, 395.53, 450, 909
See application file for complete search history.

(56) References Cited

U.S. PATENT DOCUMENTS

| | | | |
|---|---|---|---|
| 4,675,671 A * | 6/1987 | Ishizuka | ............... H04L 12/433 370/452 |
| 6,501,785 B1 * | 12/2002 | Chang | .................. H04B 7/2621 375/133 |
| 2008/0225725 A1 | 9/2008 | Wang et al. | |
| 2009/0196175 A1 | 8/2009 | Sammour et al. | |
| 2012/0113868 A1 * | 5/2012 | Cummings | ............. H04W 8/22 370/255 |
| 2012/0122513 A1 | 5/2012 | Yang et al. | |

(Continued)

FOREIGN PATENT DOCUMENTS

| CN | 101141614 A | 3/2008 |
|---|---|---|
| CN | 101500237 A | 8/2009 |

(Continued)

*Primary Examiner* — Michael Y Mapa
(74) *Attorney, Agent, or Firm* — Slater Matsil, LLP

(57) ABSTRACT

The present embodiments disclose a network parameter adjustment method and a base station device. The method includes sending, by a first base station, first parameter adjustment token request information to a second base station, where the second base station is a parent base station of the first base station, and the first parameter adjustment token request information is used to represent that the first base station requests to obtain a parameter adjustment token. The method also includes receiving, by the first base station, the parameter adjustment token sent by the second base station, and adjusting a network parameter after receiving the parameter adjustment token.

14 Claims, 10 Drawing Sheets

```
                          101
A first base station sends first parameter adjustment token request
            information to a second base station
                          │
                          ▼  102
The first base station receives a parameter adjustment token sent by the
                    second base station
                          │
                          ▼  103
The first base station adjusts a network parameter after receiving the
              parameter adjustment token
```

(56) References Cited

U.S. PATENT DOCUMENTS

2014/0023040 A1 1/2014 Son et al.
2014/0269292 A1* 9/2014 Kalkunte .............. H04L 45/123
                                                                               370/232

FOREIGN PATENT DOCUMENTS

| CN | 101636984 A  | 1/2010  |
|----|--------------|---------|
| CN | 101741748 A  | 6/2010  |
| CN | 101933361 A1 | 12/2010 |
| CN | 102056186 A  | 5/2011  |
| CN | 102422671 A  | 4/2012  |

* cited by examiner

CONT.
FROM
FIG. 5A

↓ 406

Convert the first base station into a child base station of the second base station when the first base station sends the parameter adjustment token to the third base station

↓ 407

When needing the parameter adjustment token, the first base station sends third parameter adjustment token request information to the second base station

↓ 408

The first base station receives the parameter adjustment token sent by the second base station

↓ 409

The first base station adjusts a network parameter when receiving the parameter adjustment token

FIG. 5B

NETWORK PARAMETER ADJUSTMENT METHOD, AND BASE STATION DEVICE

CROSS-REFERENCE TO RELATED APPLICATIONS

This application is a continuation of International Application No. PCT/CN2014/085637, filed on Aug. 30, 2014, the disclosure of which is hereby incorporated by reference in its entirety.

TECHNICAL FIELD

The present embodiments relate to the field of wireless communications technologies, and in particular, to a network parameter adjustment method and a base station device.

BACKGROUND

With the development of network technologies, a communications network constituted by multiple small cells emerges, for example, an ultra-dense network. Each small cell dynamically adjusts a network parameter of the small cell, for example, signal transmit power or a tilt angle of an antenna, according to a change of a service user, a change of service distribution, or the like.

Because each small cell dynamically adjusts a network parameter of the small cell according to a service of the small cell or a change of a user, when multiple small cells constituting a communications network dynamically adjust network parameters of the small cells, signal coverage areas of two or more small cells may overlap or two adjacent small cells may simultaneously increase signal transmit power of the two small cells. Consequently, signal interference between different small cells in the communications network system is increased, which degrades communication quality of the different small cells in the communications network.

SUMMARY

In view of this, embodiments provide a network parameter adjustment method and a base station device, so as to resolve a currently existing problem: because multiple small cells in a communications network dynamically adjust network parameters of the multiple small cells, signal interference between different small cells in the communications network system is increased, which degrades communication quality of different small cells in the communications network.

According to a first aspect, a base station device is provided, where the base station device is a first base station of multiple base stations, the multiple base stations share one parameter adjustment token, and only a base station that obtains the parameter adjustment token can adjust a network parameter. The base station device includes a signal transmitter, configured to send first parameter adjustment token request information to a second base station of the multiple base stations, where the second base station is a parent base station of the first base station, and the first parameter adjustment token request information is used to represent that the first base station requests to obtain the parameter adjustment token. The base station device also includes a signal receiver, configured to receive the parameter adjustment token sent by the second base station and a processor, configured to adjust a network parameter after the parameter adjustment token is received.

With reference to the possible implementation manner of the first aspect, in a first possible implementation manner, the signal transmitter is specifically configured to send the first parameter adjustment token request information to the second base station when the network parameter needs to be adjusted and the parameter adjustment token is not obtained.

With reference to the possible implementation manner of the first aspect, or with reference to the first possible implementation manner of the first aspect, in a second possible implementation manner, the processor is further configured to convert the first base station into a parent base station of the second base station after the parameter adjustment token sent by the second base station is received.

With reference to the possible implementation manner of the first aspect, or with reference to the first possible implementation manner of the first aspect, or with reference to the second possible implementation manner of the first aspect, in a third possible implementation manner, the signal receiver is further configured to receive second parameter adjustment token request information sent by a third base station, where the first base station is a parent base station of the third base station, and the second parameter adjustment token request information is used to represent that the third base station requests to obtain the parameter adjustment token; and the processor is specifically configured to determine, according to the second parameter adjustment token request information after the parameter adjustment token is received, whether to reserve the parameter adjustment token; and adjust a network parameter when determining to reserve the parameter adjustment token, or send the parameter adjustment token to the third base station when determining not to reserve the parameter adjustment token.

With reference to the third possible implementation manner of the first aspect, in a fourth possible implementation manner, the processor is specifically configured to determine to reserve the parameter adjustment token and adjust a network parameter when a time at which the signal transmitter sends the first parameter adjustment token request information is earlier than a time at which the signal receiver receives the second parameter adjustment token request information sent by the third base station.

With reference to the third possible implementation manner of the first aspect, in a fifth possible implementation manner, the processor is specifically configured to determine to reserve the parameter adjustment token and adjust a network parameter when token request strength of the first base station is greater than token request strength of the third base station that is carried in the received second parameter adjustment token request information, where the token request strength is used to represent network performance after a base station that requests the parameter adjustment token adjusts a network parameter when obtaining the parameter adjustment token.

According to a second aspect, a base station device is provided, where the base station device is a first base station of multiple base stations, the multiple base stations share one parameter adjustment token, and only a base station that obtains the parameter adjustment token can adjust a network parameter; and the base station device includes: a signal receiver, configured to receive first parameter adjustment token request information sent by a second base station, where the first base station is a parent base station of the second base station, and the first parameter adjustment token request information is used to represent that the second base station requests to obtain the parameter adjustment token; and a signal transmitter, configured to send second parameter adjustment token request information to a third base station of the multiple base stations when the parameter adjustment token is not obtained, where the third base station is a parent base station of the first base station, and the second parameter adjustment token request information is used to request to obtain the parameter adjustment token; where the signal receiver is further configured to receive the parameter adjustment token sent by the third base station; and the signal transmitter is further configured to send the parameter adjustment token to the second base station, so that the second base station can adjust a network parameter when receiving the parameter adjustment token.

With reference to the possible implementation manner of the second aspect, in a first possible implementation manner, the base station device further includes a processor, where the processor is configured to convert the first base station into a child base station of the second base station after the parameter adjustment token is sent to the second base station.

With reference to the possible implementation manner of the second aspect, or with reference to the first possible implementation manner of the second aspect, in a second possible implementation manner, wherein the signal transmitter is specifically configured to earliest receive first parameter adjustment token request information sent by the second base station; and send the received parameter adjustment token to the second base station.

With reference to the possible implementation manner of the second aspect, or with reference to the first possible implementation manner of the second aspect, in a third possible implementation manner, the signal transmitter is specifically configured to: receive the first parameter adjustment token request information sent by the second base station, where the first parameter adjustment token request information carries the highest token request strength; and send the received parameter adjustment token to the second base station, where the token request strength is used to represent network performance after a base station that requests the parameter adjustment token adjusts a network parameter when obtaining the parameter adjustment token.

With reference to the possible implementation manner of the second aspect, or with reference to the first possible implementation manner of the second aspect, or with reference to the second possible implementation manner of the second aspect, or with reference to the third possible implementation manner of the second aspect, in a fourth possible implementation manner, the signal transmitter is further configured to send third parameter adjustment token request information to the second base station after the first base station is converted into the child base station of the second base station, where the third parameter adjustment token request information is used to represent a request for obtaining the parameter adjustment token; the signal receiver is further configured to receive the parameter adjustment token sent by the second base station; and the processor is further configured to adjust a network parameter after the parameter adjustment token sent by the second base station is received.

According to a third aspect, a network parameter adjustment device is provided, where a base station in which the network parameter adjustment device is located is a first base station of multiple base stations, the multiple base stations share one parameter adjustment token, and only a base station that obtains the parameter adjustment token can adjust a network parameter; and the network parameter adjustment device includes: a sending module, configured to send first parameter adjustment token request information to a second base station of the multiple base stations, where the second base station is a parent base station of the first base station, and the first parameter adjustment token request information is used to represent that the first base station requests to obtain the parameter adjustment token; a receiving module, configured to receive the parameter adjustment token sent by the second base station; and a parameter adjustment module, configured to adjust a network parameter after the receiving module receives the parameter adjustment token.

With reference to the possible implementation manner of the third aspect, in a first possible implementation manner, the sending module is specifically configured to send the first parameter adjustment token request information to the second base station when the network parameter needs to be adjusted and the parameter adjustment token is not obtained.

With reference to the possible implementation manner of the third aspect, or with reference to the first possible implementation manner of the third aspect, in a second possible implementation manner, the network parameter adjustment device further includes a conversion module, where the conversion module is configured to convert the first base station into a parent base station of the second base station after the parameter adjustment token sent by the second base station is received.

With reference to the possible implementation manner of the third aspect, or with reference to the first possible implementation manner of the third aspect, or with reference to the second possible implementation manner of the third aspect, in a third possible implementation manner, the receiving module is further configured to receive second parameter adjustment token request information sent by a third base station, where the first base station is a parent base station of the third base station, and the second parameter adjustment token request information is used to represent that the third base station requests to obtain the parameter adjustment token; the parameter adjustment module is specifically configured to determine, according to the second parameter adjustment token request information after the parameter adjustment token is received, whether to reserve the parameter adjustment token; and adjust a network parameter when determining to reserve the parameter adjustment token, or trigger the sending module when determining not to reserve the parameter adjustment token; and the sending module is further configured to send the parameter adjustment token to the third base station.

With reference to the third possible implementation manner of the third aspect, in a fourth possible implementation manner, the parameter adjustment module is specifically configured to determine to reserve the parameter adjustment token and adjust a network parameter when a time at which the signal transmitter sends the first parameter adjustment token request information is earlier than a time at which the signal receiver receives the second parameter adjustment token request information sent by the third base station.

With reference to the third possible implementation manner of the third aspect, in a fifth possible implementation manner, the parameter adjustment module is specifically configured to determine to reserve the parameter adjustment token and adjust a network parameter when token request strength of the first base station is greater than token request strength of the third base station that is carried in the received second parameter adjustment token request information, where the token request strength is used to represent network performance after a base station that requests the parameter adjustment token adjusts a network parameter when obtaining the parameter adjustment token.

According to a fourth aspect, a network parameter adjustment device is provided, where a base station in which the network parameter adjustment device is located is a first base station of multiple base stations, the multiple base stations share one parameter adjustment token, and only a base station that obtains the parameter adjustment token can adjust a network parameter; and the device includes: a receiving module, configured to receive first parameter adjustment token request information sent by a second base station, where the first base station is a parent base station of the second base station, and the first parameter adjustment token request information is used to represent that the second base station requests to obtain the parameter adjustment token; and a sending module, configured to send second parameter adjustment token request information to a third base station of the multiple base stations when the parameter adjustment token is not obtained, where the third base station is a parent base station of the first base station, and the second parameter adjustment token request information is used to request to obtain the parameter adjustment token; where the receiving module is further configured to receive the parameter adjustment token sent by the third base station; and the sending module is further configured to send the parameter adjustment token to the second base station, so that the second base station can adjust a network parameter when receiving the parameter adjustment token.

With reference to the possible implementation manner of the fourth aspect, in a first possible implementation manner, the network parameter adjustment device further includes a conversion module, where the conversion module is configured to convert the first base station into a child base station of the second base station after the parameter adjustment token is sent to the second base station.

With reference to the possible implementation manner of the fourth aspect, or with reference to the first possible implementation manner of the fourth aspect, in a second possible implementation manner, the sending module is specifically configured to: earliest receive first parameter adjustment token request information sent by the second base station; and send the received parameter adjustment token to the second base station.

With reference to the possible implementation manner of the fourth aspect, or with reference to the first possible implementation manner of the fourth aspect, in a third possible implementation manner, the sending module is specifically configured to: receive the first parameter adjustment token request information sent by the second base station, where the first parameter adjustment token request information carries the highest token request strength; and send the received parameter adjustment token to the second base station, where the token request strength is used to represent network performance after a base station that requests the parameter adjustment token adjusts a network parameter when obtaining the parameter adjustment token.

With reference to the possible implementation manner of the fourth, or with reference to the first possible implementation manner of the fourth aspect, or with reference to the second possible implementation manner of the fourth aspect, or with reference to the third possible implementation manner of the fourth, in a fourth possible implementation manner, the network parameter adjustment device further includes a parameter adjustment module, where the sending module is further configured to send third parameter adjustment token request information to the second base station after the first base station is converted into the child base station of the second base station, where the third parameter adjustment token request information is used to represent a request for obtaining the parameter adjustment token; the receiving module is further configured to receive the parameter adjustment token sent by the second base station; and the parameter adjustment module is configured to adjust a network parameter after the parameter adjustment token sent by the second base station is received.

According to a fifth aspect, a network parameter adjustment method is provided, where a first base station is one of multiple base stations, the multiple base stations share one parameter adjustment token, and only a base station that obtains the parameter adjustment token can adjust a network parameter; and the method includes: sending, by the first base station, first parameter adjustment token request information to a second base station of the multiple base stations, where the second base station is a parent base station of the first base station, and the first parameter adjustment token request information is used to represent that the first base station requests to obtain the parameter adjustment token; receiving, by the first base station, the parameter adjustment token sent by the second base station; and adjusting, by the first base station, the network parameter after receiving the parameter adjustment token.

With reference to the possible implementation manner of the fifth aspect, in a first possible implementation manner, the sending, by the first base station, first parameter adjustment token request information to a second base station of the multiple base stations specifically includes: sending, by the first base station, the first parameter adjustment token request information to the second base station when needing to adjust a network parameter and not obtaining the parameter adjustment token.

With reference to the possible implementation manner of the fifth aspect, or with reference to the first possible implementation manner of the fifth aspect, in a second possible implementation manner, after the receiving, by the first base station, the parameter adjustment token sent by the second base station, the method further includes: converting the first base station into a parent base station of the second base station after the first base station receives the parameter adjustment token sent by the second base station.

With reference to the possible implementation manner of the fifth aspect, or with reference to the first possible implementation manner of the fifth aspect, or with reference to the second possible implementation manner of the fifth aspect, in a third possible implementation manner, the adjusting, by the first base station, the network parameter specifically includes: receiving, by the first base station, second parameter adjustment token request information sent by a third base station, where the first base station is a parent base station of the third base station, and the second parameter adjustment token request information is used to represent that the third base station requests to obtain the parameter adjustment token; and determining, by the first base station according to the second parameter adjustment token request information after receiving the parameter adjustment token, whether to reserve the parameter adjustment token; and adjusting a network parameter when determining to reserve the parameter adjustment token, or sending the parameter adjustment token to the third base station when determining not to reserve the parameter adjustment token.

With reference to the third possible implementation manner of the fifth aspect, in a fourth possible implementation manner, the adjusting a network parameter when the first base station determines to reserve the parameter adjustment token specifically includes: determining to reserve the parameter adjustment token and adjusting a network parameter when a time at which the first base station sends the first parameter adjustment token request information is earlier than a time at which the first base station receives the second parameter adjustment token request information sent by the third base station.

With reference to the third possible implementation manner of the fifth aspect, in a fifth possible implementation manner, the adjusting a network parameter when the first base station determines to reserve the parameter adjustment token includes: determining, by the first base station, to reserve the parameter adjustment token and adjusting a network parameter when token request strength of the first base station is greater than token request strength of the third base station that is carried in the received second parameter adjustment token request information, where the token request strength is used to represent network performance after a base station that requests the parameter adjustment token adjusts a network parameter when obtaining the parameter adjustment token.

According to a sixth aspect, a network parameter adjustment method is provided, where a first base station is one of multiple base stations, the multiple base stations share one parameter adjustment token, and only a base station that obtains the parameter adjustment token can adjust a network parameter; and the method includes: receiving, by the first base station, first parameter adjustment token request information sent by a second base station, where the first base station is a parent base station of the second base station, and the first parameter adjustment token request information is used to represent that the second base station requests to obtain the parameter adjustment token; sending, by the first base station, second parameter adjustment token request information to a third base station of the multiple base stations when not obtaining the parameter adjustment token, where the third base station is a parent base station of the first base station, and the second parameter adjustment token request information is used to request to obtain the parameter adjustment token; receiving, by the first base station, the parameter adjustment token sent by the third base station; and sending, by the first base station, the parameter adjustment token to the second base station, so that the second base station can adjust a network parameter when receiving the parameter adjustment token.

With reference to the possible implementation manner of the sixth aspect, in a first possible implementation manner, the method further includes: converting the first base station into a child base station of the second base station after the first base station sends the parameter adjustment token to the second base station.

With reference to the possible implementation manner of the sixth aspect, or with reference to the first possible implementation manner of the sixth aspect, in a second possible implementation manner, the sending, by the first base station, the parameter adjustment token to the second base station includes: earliest receiving, by the first base station, the first parameter adjustment token request information sent by the second base station, and sending the received parameter adjustment token to the second base station.

With reference to the possible implementation manner of the sixth aspect, or with reference to the first possible implementation manner of the sixth aspect, in a third possible implementation manner, the sending, by the first base station, the parameter adjustment token to the second base station includes: receiving, by the first base station, the first parameter adjustment token request information sent by the second base station, where the first parameter adjustment token request information carries the highest token request strength, and sending the received parameter adjustment token to the second base station, where the token request strength is used to represent network performance after a base station that requests the parameter adjustment token adjusts a network parameter when obtaining the parameter adjustment token.

With reference to the possible implementation manner of the sixth aspect, or with reference to the first possible implementation manner of the sixth aspect, or with reference to the second possible implementation manner of the sixth aspect, or with reference to the third possible implementation manner of the sixth aspect, in a fourth possible implementation manner, the method further includes: sending, by the first base station, third parameter adjustment token request information to the second base station after the first base station is converted into the child base station of the second base station, where the third parameter adjustment token request information is used to represent a request for obtaining the parameter adjustment token; receiving, by the first base station, the parameter adjustment token sent by the second base station; and adjusting, by the first base station, the network parameter after receiving the parameter adjustment token sent by the second base station.

According to the embodiments, a first base station sends first parameter adjustment token request information to a second base station, where the second base station is a parent base station of the first base station, and the first parameter adjustment token request information is used to represent that the first base station requests to obtain a parameter adjustment token; and the first base station receives the parameter adjustment token sent by the second base station, and adjusts a network parameter after receiving the parameter adjustment token. In this way, when needing to adjust a network parameter, the first base station requests the parameter adjustment token from the parent base station of the first base station, which means that the first base station obtains the parameter adjustment token. The first base station obtains permission to adjust a network parameter, and can adjust a network parameter of the first base station. This achieves an objective that, at a time, only one base station in a base station cluster has the permission to adjust a network parameter, and effectively avoids a problem that signal interference is strengthened because multiple base stations in the base station cluster simultaneously adjust a network parameter, thereby improving system performance.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

FIG. 5A and FIG. 5B are a schematic flowchart of a network parameter adjustment method according to Embodiment 3;

DETAILED DESCRIPTION OF ILLUSTRATIVE EMBODIMENTS

Figure 1A:
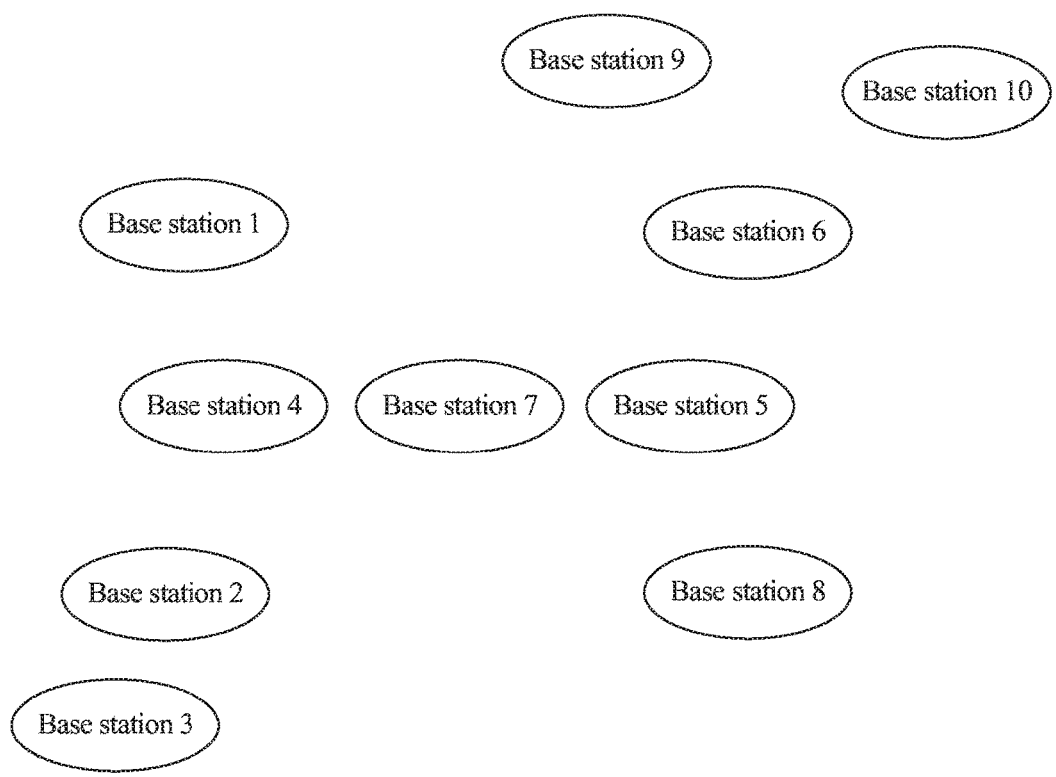
FIG. 1(a) is an area distribution diagram of 10 small cells in a base station cluster.

To achieve an objective, embodiments provide a network parameter adjustment method and device, and a base station device. A first base station sends first parameter adjustment token request information to a second base station, where the second base station is a parent base station of the first base station, and the first parameter adjustment token request information is used to represent that the first base station requests to obtain a parameter adjustment token; and the first base station receives the parameter adjustment token sent by the second base station, and adjusts a network parameter after receiving the parameter adjustment token. In this way, when needing to adjust a network parameter, the first base station requests the parameter adjustment token from the parent base station of the first base station, which means that the first base station obtains the parameter adjustment token. The first base station obtains permission to adjust a network parameter, and can adjust a network parameter of the first base station. This achieves an objective that, at a time, only one base station in a base station cluster has the permission to adjust a network parameter, and effectively avoids a problem that signal interference is strengthened because multiple base stations in the base station cluster simultaneously adjust a network parameter, thereby improving system performance.

The embodiments are applied to constitute a base station cluster by using multiple small cells in an area, and introduce a network parameter coordination mechanism between base stations into the base station cluster; that is, a parameter adjustment token is allocated to the base station cluster, the parameter adjustment token is transferred among different base stations included in the base station cluster, and a base station that requests to obtain the parameter adjustment token has permission to adjust a network parameter. In this way, only one base station in the base station cluster is capable of adjusting a network parameter at a time, which effectively avoids a problem that signal interference is strengthened because multiple base stations in the base station cluster simultaneously adjust a network parameter, thereby improving system performance.

It should be noted that "first," "second," and "third" in "first base station," "second base station," and "third base station" involved in the embodiments do not have special meanings, and are used only to distinguish between different base stations. "First," "second," and "third" in "first parameter adjustment token request information," "second parameter adjustment token request information," and "third parameter adjustment token request information" involved in the embodiments do not have special meanings, and are used only to distinguish between different base stations that send parameter adjustment token request information.

When a base station cluster is initialized, a parameter adjustment token is configured for the base station cluster.

Regarding transfer of the parameter adjustment token, a base station configured with the parameter adjustment token at an initialization stage is a parent base station of the other base stations included in the base station cluster.

Specifically, when the base station cluster is initialized, a parameter adjustment token is allocated to the base station cluster, and a rule for transferring the parameter adjustment token in the base station cluster is determined, so as to avoid a subsequent problem of severe interference between different base stations due to a network parameter adjustment.

Specifically, the base station cluster is initialized to be a tree network, and a root node of the tree network is determined; and which base station of two different base stations in the base station cluster is a parent base station of the other base station is further determined.

The rule for transferring the parameter adjustment token in the base station cluster is: regarding transfer of the parameter adjustment token, the parameter adjustment token is transferred to a child base station by a parent base station, and after the parameter adjustment token is transferred, a parent-child relationship between the previous parent base station and the previous child base station is adjusted.

That is, when a base station 1 is a parent base station of a base station 2, and the base station 2 is a child base station of the base station 1, the parameter adjustment token is sent to the base station 2 by the base station 1; after the parameter adjustment token is transferred, a parent-child relationship between the previous parent base station and the previous child base station is adjusted, that is, the base station 2 is a parent base station of the base station 1, and the base station 1 is a child base station of the base station 2.

It should be noted that the base station cluster includes multiple parent base stations, and each parent base station has at least one child base station; the multiple parent base stations have a top-level parent base station, and the top-level parent base station is the root node of the tree network. When the base station cluster is initialized, the allocated parameter adjustment token is configured for the top-level parent base station.

Specifically, that a parameter adjustment token is configured for the base station cluster includes: determining, according to location information of all base stations in the base station cluster, a base station located in a central position of the base station cluster, and configuring the parameter adjustment token for the base station located in the central position of the base station cluster.

Specifically, a manner of determining a top-level parent base station in a base station cluster includes but is not limited to: when a base station cluster is initialized, determining location information of all base stations in the base station cluster; and determining, according to the location information of all the base stations in the base station cluster, a base station located in a central position of the base station cluster, and determining the base station located in the central position as a top-level parent base station of the base station cluster.

When the base station cluster is initialized, the parameter adjustment token is configured for the base station located in the central position of the base station cluster.

When the base station cluster is initialized, and the base station in the central position of the base station cluster is determined as a parent base station of other base stations included in the base station cluster, parent base stations of different base stations in the base station cluster are determined according to location information of each of the other base stations in the base station cluster, where a parent base station at each level includes at least one child base station.

Specifically, the determined base station in the central position of the base station cluster is used as a center, and a group of base stations whose distances from the base station in the central position are less than a preset threshold are selected as first-level child base stations of the base station in the central position of the base station cluster.

Each base station of the first-level child base stations is used as a center, and a group of base stations whose distances from any base station of the first-level child base stations are less than the preset threshold are selected as second-level child base stations of the base station in the central position of the base station cluster and as child base stations of the first-level child base stations, where a base station that is a first-level child base station and a base station that is a second-level child base station do not overlap each other.

By analogy, a parent base station of each base station in the base station cluster is determined.

It should be noted that the preset threshold may be determined according to a requirement, or may be determined according to an experimental result; a determining manner is not limited herein.

For example, a base station cluster includes 10 small cells: a base station 1, a base station 2, a base station 3, a base station 4, a base station 5, a base station 6, a base station 7, a base station 8, a base station 9, and a base station 10. FIG. 1(*a*) is an area distribution diagram of the 10 small cells in the base station cluster.

Because of interference between the 10 small cells, a tree network structure of the base station cluster needs to be established according to location information of the 10 small cells, which is shown as FIG. 1(*b*).

It may be learned from FIG. 1(*b*) that the base station 7 is a determined top-level parent base station (that is, a root node); the base station 4 and the base station 5 are first-level child base stations; the base station 1, the base station 2, the base station 6, and the base station 8 are second-level child base stations; and the base station 3, the base station 9, and the base station 10 are third-level child base stations.

The base station 7 is a parent base station of the base station 4 and the base station 5. The base station 4 is a parent base station of the base station 1 and the base station 2. The base station 5 is a parent base station of the base station 6 and the base station 8. The base station 2 is a parent base station of the base station 3. The base station 6 is a parent base station of the base station 9 and the base station 10.

When a parent base station or a child base station of each base station in the base station cluster is determined, an identifier of a parent base station is written in a local parent base station indication module, and an identifier of a child base station is written in a local child base station indication module.

For example, the base station 7 has only child base stations, and an identifier of the base station 4 and an identifier of the base station 5 are written in the local child base station indication module; the base station 1 has only the parent base station, and the identifier of the base station 4 is written in the local parent base station indication module; the base station 3 has only the parent base station, and an identifier of the base station 2 is written in the local parent base station indication module; the base station 9 has only the parent base station, and an identifier of the base station 6 is written in the local parent base station indication module; the base station 10 has only the parent base station, and the identifier of the base station 6 is written in the local parent base station indication module; the base station 8 has only the parent base station, the identifier of the base station 5 is written in the local parent base station indication module; the base station 4 has both child base stations and the parent base station, and an identifier of the base station 7 is written in the local parent base station indication module, and an identifier of the base station 1 is written in the local child base station indication module; the base station 5 has both child base stations and the parent base station, and the identifier of the base station 7 is written in the local parent base station indication module, and an identifier of the base station 8 is written in the local child base station indication module; the base station 2 has both a child base station and the parent base station, and the identifier of the base station 4 is written in the local parent base station indication module, and an identifier of the base station 3 is written in the local child base station indication module; the base station 6 has both child base stations and the parent base station, and the identifier of the base station 5 is written in the local parent base station indication module, and an identifier of the base station 9 and an identifier of the base station 10 are written in the local child base station indication module.

The following describes in detail the embodiments with reference to the accompanying drawings in the specification. Apparently, the described embodiments are merely some but not all of the embodiments. All other embodiments obtained by a person of ordinary skill in the art based on the embodiments without creative efforts shall fall within the protection scope.

Embodiment 1

Figure 2:
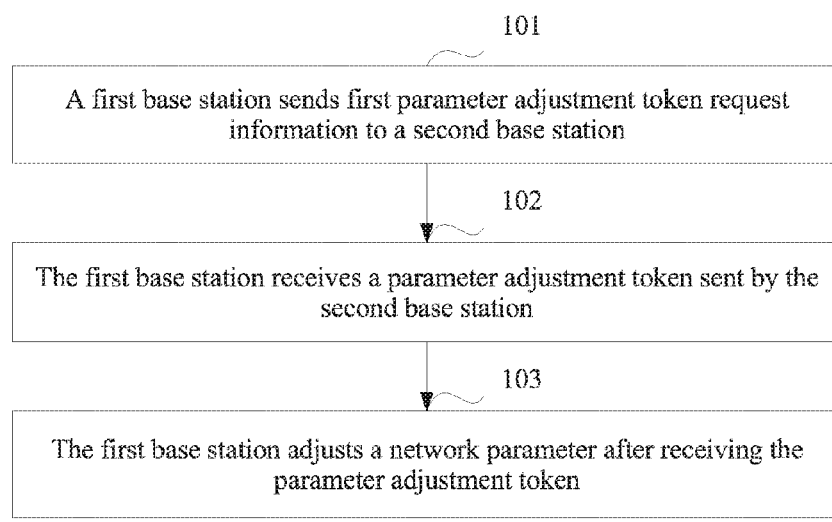
FIG. 2 is a schematic flowchart of a network parameter adjustment method according to Embodiment 1.

FIG. 2 is a schematic flowchart of a network parameter adjustment method according to Embodiment 1. The method may be described as follows.

Step 101: A first base station sends first parameter adjustment token request information to a second base station.

The second base station is a parent base station of the first base station, and the first parameter adjustment token request information is used to represent that the first base station requests to obtain a parameter adjustment token.

In step 101, multiple small cells are distributed in an area (a diameter of the area may be tens of meters, or may be hundreds of meters), where the small cells include the first base station and the second base station. For an area in which multiple small cells are distributed, a base station cluster specific to the area is generated at an up-front base station planning stage.

Whether the base station cluster uses distributed collaboration to avoid a problem of relatively great interference between base stations due to a network parameter adjustment needs to be determined according to whether mutual interference between base stations in the base station cluster exists. If interference between the base stations in the base station cluster due to a network parameter adjustment is relatively great, the distributed collaboration is triggered and a subsequent operation is performed; or if interference between base stations in the base station cluster due to a network parameter adjustment is relatively small, the distributed collaboration is not triggered.

Specifically, when determining that a network parameter needs to be adjusted, the first base station determines whether the first base station is capable of adjusting a network parameter, that is, whether the base station obtains the parameter adjustment token. When a determining result is that the parameter adjustment token is not obtained, the first base station sends the first parameter adjustment token request information to the parent base station of the first base station, that is, the second base station.

Specifically, the first base station may determine, according to a locally stored identifier of the parent base station, an object to which the first parameter adjustment token request information is sent.

For example, when determining that a network parameter needs to be adjusted, a base station 4 determines that the parameter adjustment token is not obtained. In this case, the base station 4 sends the first parameter adjustment token request information to a base station 7.

When determining that a network parameter needs to be adjusted, a base station 9 determines that the parameter adjustment token is not obtained. In this case, the base station 9 sends the first parameter adjustment token request information to a base station 6.

Step 102: The first base station receives a parameter adjustment token sent by the second base station.

In step 102, when receiving the first parameter adjustment token request information sent by the first base station, the second base station determines whether the second base station obtains the parameter adjustment token. If the base station obtains the parameter adjustment token, the second base station sends the parameter adjustment token to the first base station device; or if the base station does not obtain the parameter adjustment token, the second base station needs to forward the first parameter adjustment token request information to a parent base station of the second base station, and send the parameter adjustment token to the first base station device after receiving the parameter adjustment token sent by the parent base station of the second base station.

In another embodiment, the method further includes: converting the first base station into a parent base station of the second base station when the first base station receives the parameter adjustment token sent by the second base station, and converting the second base station into a child base station of the first base station.

It should be noted that, in a process of transferring the parameter adjustment token in this embodiment, the parameter adjustment token is generally sent by a parent base station to a child base station, which means that a base station that has the parameter adjustment token is a local parent base station. When a parent base station sends the parameter adjustment token to another base station, the parent base station is converted into a child base station that receives the parameter adjustment token.

Figure 1B:
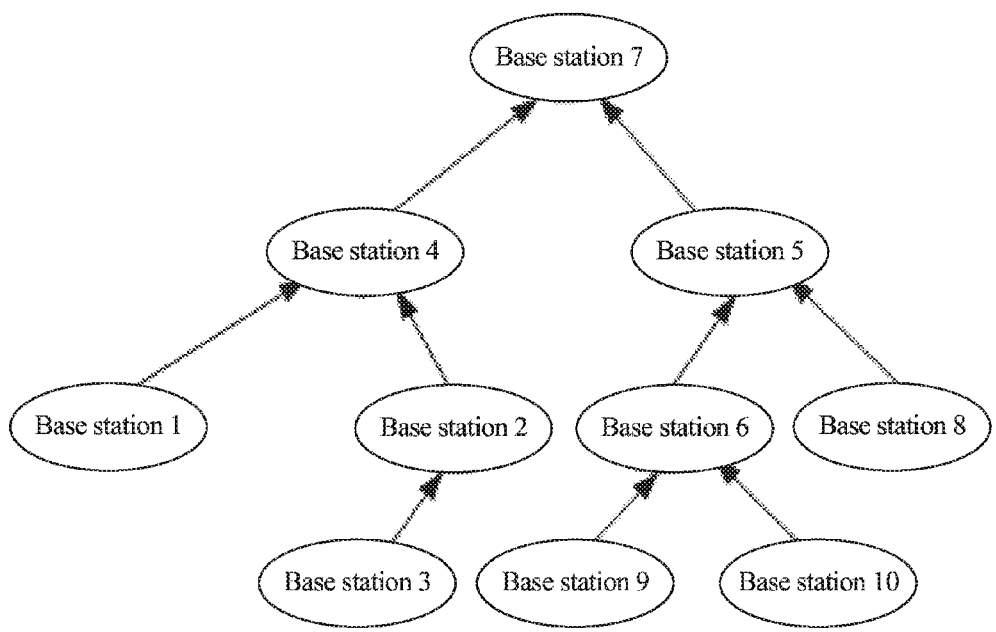
FIG. 1(b) is a tree network structure of the base station cluster established according to location information of 10 small cells.

It is assumed that, in the structural diagram shown in FIG. 1(b) that is still used as an example, the base station 4 sends first parameter adjustment token request information to the base station 7. In this case, the base station 4 receives the parameter adjustment token of the base station 7; in this case, the base station 4 is converted into a parent base station of the base station 7, and the base station 7 is converted into a child base station of the base station 4, which means that child base stations of the base station 4 include the base station 1, the base station 2, and the base station 7. The tree network structure of the base station cluster is changed, and the changed tree network structure is shown as FIG. 3(a).

Figure 3A:
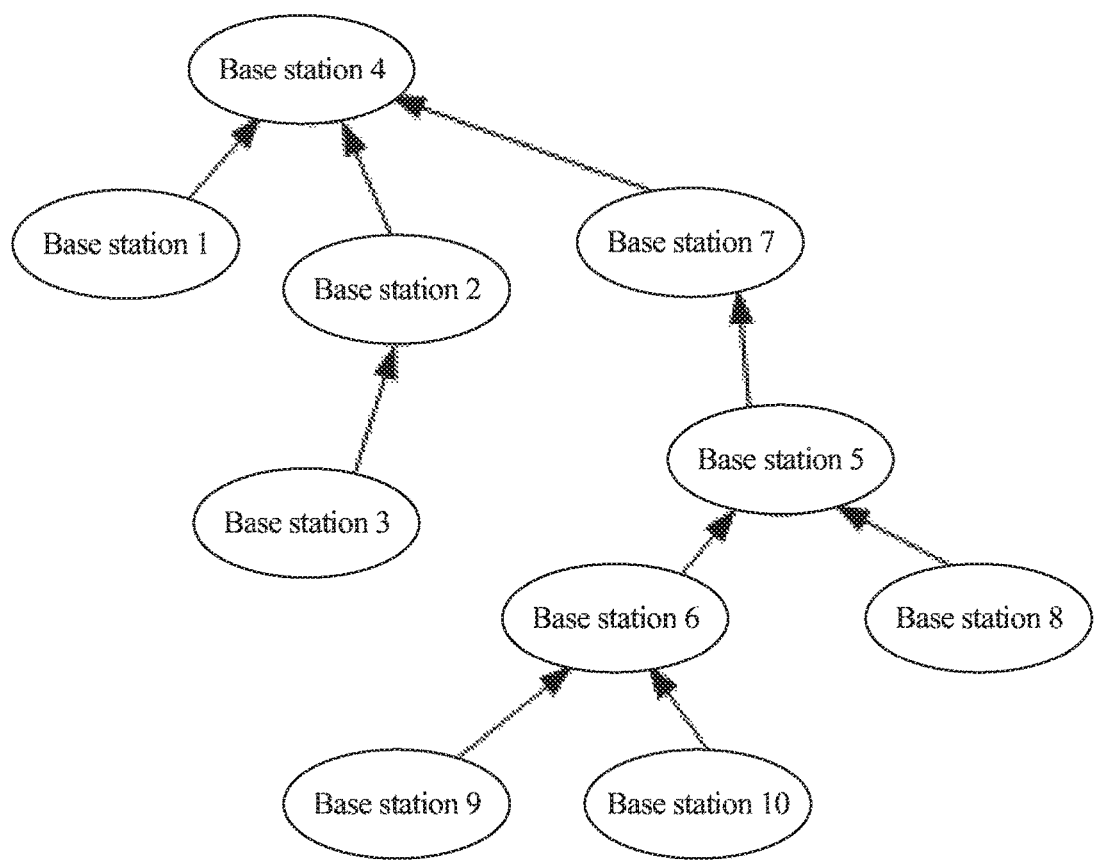
FIG. 3(a) is a changed tree network structure.

It may be learned from FIG. 3(a) that the top-level parent base station of the base station cluster is changed into the base station 4, and the base station 4 corresponds to three child base stations: the base station 1, the base station 2, and the base station 7. A child base station 3 corresponding to the base station 2 is not changed, and what changes is: the base station 7 is changed into a child base station of the base station 4. In this case, for the base station 4, a first-level child base station includes: the base station 1, the base station 2, and the base station 7; second-level child base stations include: the base station 3 and the base station 5; third-level child base stations include: the base station 6 and the base station 8; and fourth-level child base stations include: the base station 9 and the base station 10.

It is assumed that, in the structural diagram shown in FIG. 1(b) that is still used as an example, the base station 9 sends first parameter adjustment token request information to the base station 6. In this case, when determining that the parameter adjustment token is not obtained, the base station 6 sends the first parameter adjustment token request information to the base station 5, and when determining that the parameter adjustment token is not obtained, the base station 5 sends the first parameter adjustment token request information to the base station 7. In this case, the base station 5 receives the parameter adjustment token sent by the base station 7, and adjusts a parent-child relationship between the base station 5 and the base station 7; that is, the base station 5 is converted into a parent base station of the base station 7, and the base station 7 is converted into a child base station of the base station 5. The base station 6 receives the parameter adjustment token sent by the base station 5, and adjusts a parent-child relationship between the base station 6 and the base station 5; that is, the base station 6 is converted into a parent base station of the base station 5, and the base station 5 is converted into a child base station of the base station 6. The base station 6 sends the parameter adjustment token to the base station 9, and adjusts a parent-child relationship between the base station 6 and the base station 9; that is, the base station 9 is converted into a parent base station of the base station 6, and the base station 6 is converted into a child base station of the base station 9. In this case, child base stations of the base station 9 include the base station 6, which means that the tree network structure of the base station cluster is changed, and the changed tree network structure is shown as FIG. 3(b).

Figure 3B:
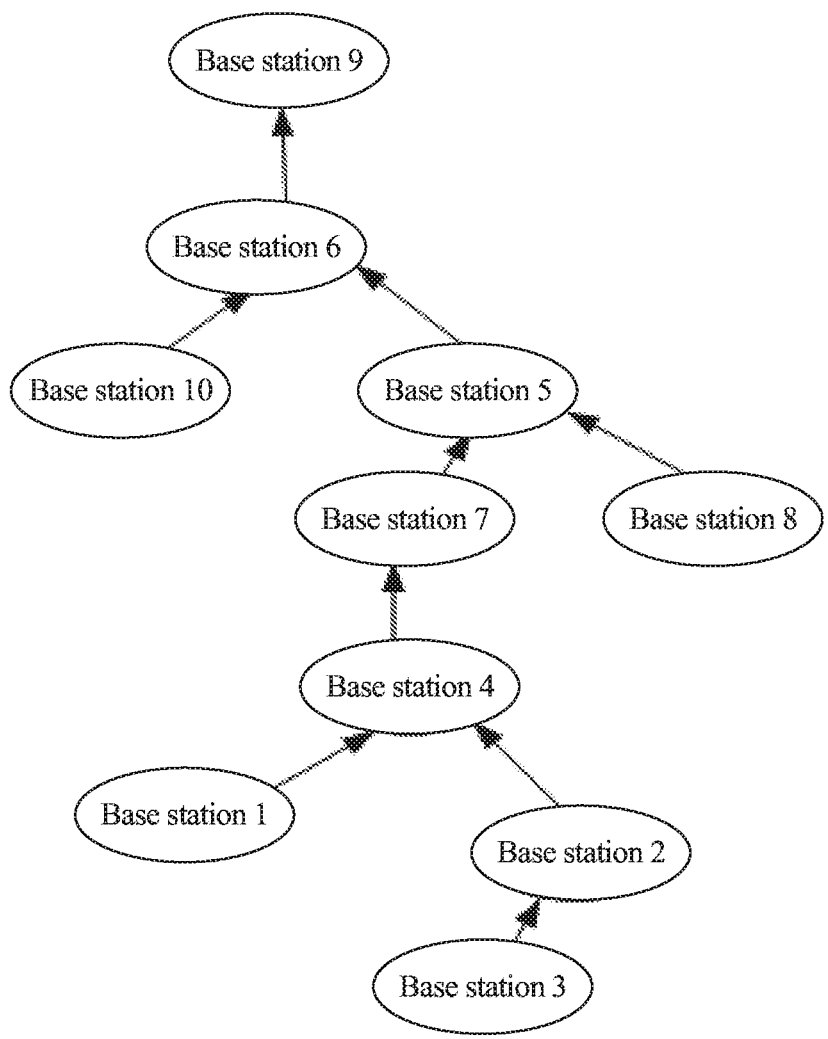
FIG. 3(b) is a changed tree network structure.

It may be learned from FIG. 3(b) that the top-level parent base station of the base station cluster is changed into the base station 9, and the base station 9 corresponds to a child base station 6. The child base station 1 and the child base station 2 corresponding to the base station 4 are not changed. The base station 3 is still a child base station of the base station 2, the base station 8 is still a child base station of the base station 5, and the base station 10 is still a child base station of the base station 6. What changes is: the base station 7 is changed into a child base station of the base station 5. In this case, for the base station 9, a first-level child base station includes: the base station 6; second-level child base stations include: the base station 10 and the base station 5; third-level child base stations include: the base station 7 and the base station 8; a fourth-level child base station includes: the base station 4; fifth-level child base stations include: the base station 1 and the base station 2; and a sixth-level child base station includes: the base station 3.

Step 103: The first base station adjusts a network parameter after receiving the parameter adjustment token.

In step 103, when receiving the parameter adjustment token, the first base station determines that the base station has permission to adjust a network parameter, and adjusts a network parameter of the first base station.

According to the solution in Embodiment 1, a first base station sends first parameter adjustment token request information to a second base station, where the second base station is a parent base station of the first base station, and the first parameter adjustment token request information is used to represent that the first base station requests to obtain a parameter adjustment token; and the first base station receives the parameter adjustment token sent by the second base station, and adjusts a network parameter after receiving the parameter adjustment token. In this way, when needing to adjust a network parameter, the first base station requests the parameter adjustment token from the parent base station of the first base station, which means that the first base station obtains the parameter adjustment token. The first base station obtains permission to adjust a network parameter, and can adjust a network parameter of the first base station. This achieves an objective that, at a time, only one base station in a base station cluster has the permission to adjust a network parameter, and effectively avoids a problem that signal interference is strengthened because multiple base stations in the base station cluster simultaneously adjust a network parameter, thereby improving system performance.

Embodiment 2

Figure 4A:
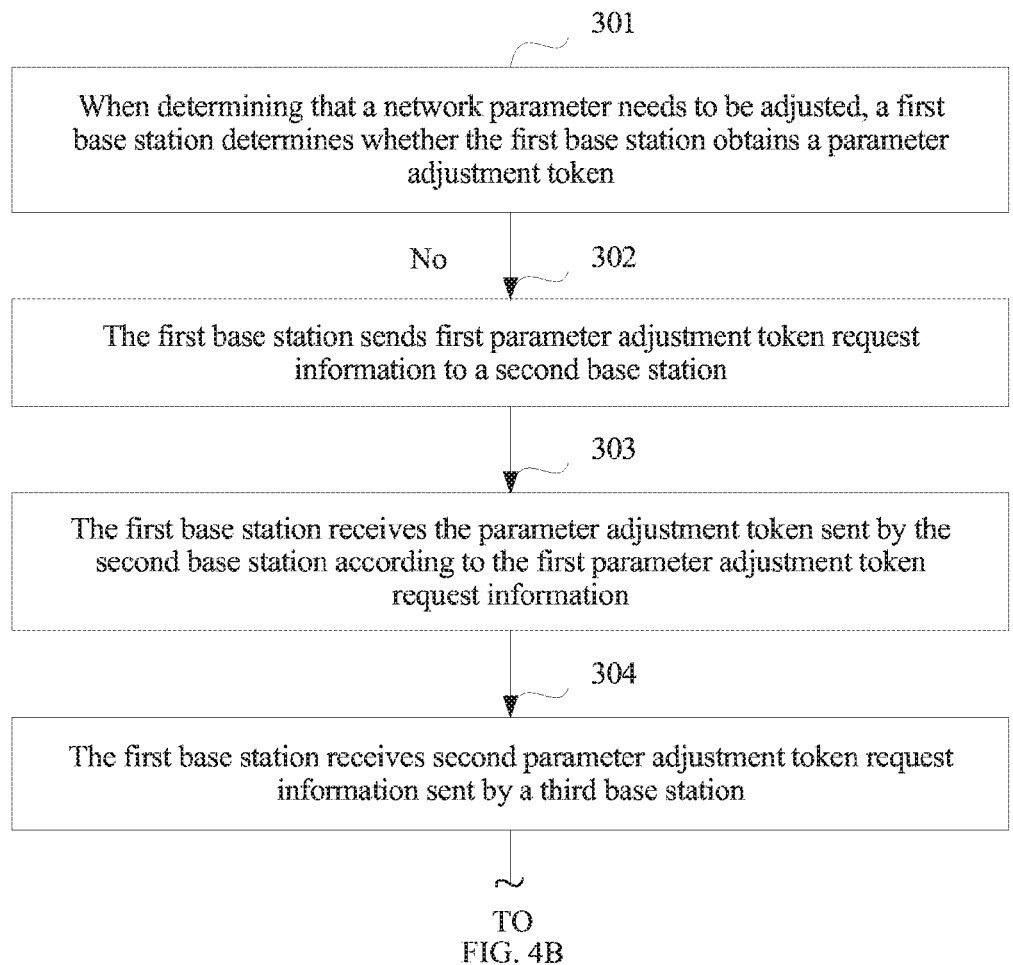
FIG. 4A and FIG. 4B are a schematic flowchart of a network parameter adjustment method according to Embodiment 2.
Figure 4B:
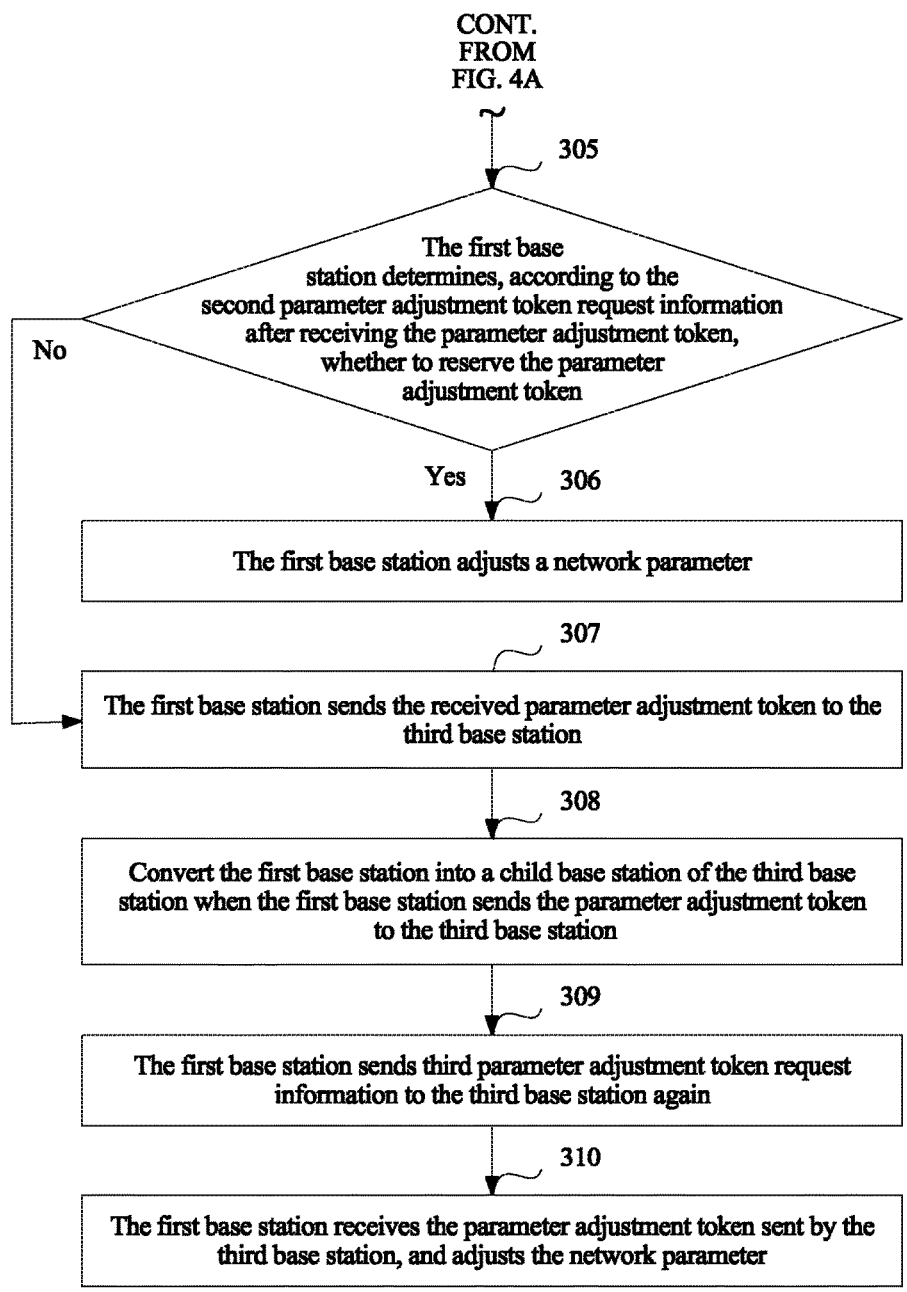

FIG. 4A and FIG. 4B are a schematic flowchart of a network parameter adjustment method according to Embodiment 2. The method may be described as follows.

Step 301: When determining that a network parameter needs to be adjusted, a first base station determines whether the first base station obtains a parameter adjustment token. If the first base station obtains the parameter adjustment token, an operation of adjusting a network parameter is performed; or if the first base station does not obtain the parameter adjustment token, step 302 is performed.

In step 301, when determining that the network parameter needs to be adjusted, the first base station determines whether a parameter adjustment token indication module stores the parameter adjustment token. If the parameter adjustment token indication module does not store the parameter adjustment token, it is determined that the base station does not obtain the parameter adjustment token, that is, the base station does not have permission to adjust a network parameter; or if the parameter adjustment token indication module stores the parameter adjustment token, it is determined that the base station obtains the permission to adjust a network parameter.

Step 302: The first base station sends first parameter adjustment token request information to a second base station.

The second base station is a parent base station of the first base station, and the first parameter adjustment token request information is used to represent that the first base station requests to obtain the parameter adjustment token.

An implementation manner of step 302 is the same as an implementation manner of step 101 in Embodiment 1, which is not described in detail herein again.

Step 303: The first base station receives the parameter adjustment token sent by the second base station.

An implementation manner of step 303 is the same as an implementation manner of step 102 in Embodiment 1, which is not described in detail herein.

Step 304: The first base station receives second parameter adjustment token request information sent by a third base station.

The first base station is a parent base station of the third base station, and the second parameter adjustment token request information is used to represent that the third base station requests to obtain the parameter adjustment token.

It should be noted that step 304 is not limited to an implementation sequence described in this embodiment, or may be implemented before step 301, or may be simultaneously implemented with step 301, which is not limited herein.

Step 305: The first base station determines, according to the second parameter adjustment token request information after receiving the parameter adjustment token, whether to reserve the parameter adjustment token. If the first base station does not reserve the parameter adjustment token, step 307 is performed; or if the first base station reserves the parameter adjustment token, step 306 is performed.

In step 305, manners of determining, by the first base station, whether to reserve the parameter adjustment token include but are not limited to.

Manner 1.

The first base station compares a time at which the first base station sends the first parameter adjustment token request information with a time at which the first base station receives the second parameter adjustment token request information sent by the third base station device.

The first base station determines to reserve the parameter adjustment token if the time at which the first base station sends the first parameter adjustment token request information is earlier than the time at which the first base station receives the second parameter adjustment token request information sent by the third base station device.

The first base station determines not to reserve the parameter adjustment token if the time at which the first base station sends the first parameter adjustment token request information is not earlier than the time at which the first base station receives the second parameter adjustment token request information sent by the third base station device.

Manner 2.

The first base station compares token request strength of the first base station with token request strength that is carried in the received second parameter adjustment token and that is of the third base station.

The token request strength is used to represent network performance after a base station that requests the parameter adjustment token adjusts a network parameter when obtaining the parameter adjustment token.

The first base station determines to reserve the parameter adjustment token if the token request strength of the first base station is greater than the token request strength that is carried in the received second parameter adjustment token and that is of the third base station.

The first base station determines not to reserve the parameter adjustment token if the token request strength of the first base station is not greater than the token request strength of the third base station.

Step 306: The first base station adjusts a network parameter.

An implementation manner of step 306 is the same as an implementation manner of step 103 in Embodiment 1, which is not described in detail herein.

Optionally, after adjusting a network parameter, the first base station sends the received parameter adjustment token to the third base station.

Step 307: The first base station sends the received parameter adjustment token to the third base station.

Step 308: Convert the first base station into a child base station of the third base station when the first base station sends the parameter adjustment token to the third base station.

Step 309: The first base station sends third parameter adjustment token request information to the third base station again.

The third parameter adjustment token request information is used to represent that the first base station requests to obtain the parameter adjustment token.

In step 309, when the first base station needs to adjust a network parameter and the third base station needs to adjust a network parameter, the first base station sends the received parameter adjustment token to the third base station. In this case, the first base station further needs to send the third parameter adjustment token request information to the third base station again, so as to obtain the parameter adjustment token.

Step 310: The first base station receives the parameter adjustment token sent by the third base station, and adjusts a network parameter.

The parameter adjustment token sent by the third base station and the parameter adjustment token sent by the second base station are the same parameter adjustment token.

According to the solution in Embodiment 2, when needing to adjust a network parameter, a first base station or a child base station of the first base station requests a parameter adjustment token from a parent base station of the first base station. Then the first base station selectively determines, according to a time at which parameter adjustment token request information is sent or token request strength, to reserve the parameter adjustment token for the first base station to adjust a network parameter, or to preferentially send the parameter adjustment token to another base station for adjusting a network parameter. This achieves an objective that, at a time, only one base station in a base station cluster has permission to adjust a network parameter, and effectively avoids a problem that signal interference is strengthened because multiple base stations in the base station cluster simultaneously adjust a network parameter, thereby improving system performance.

Embodiment 3

Figure 5A:
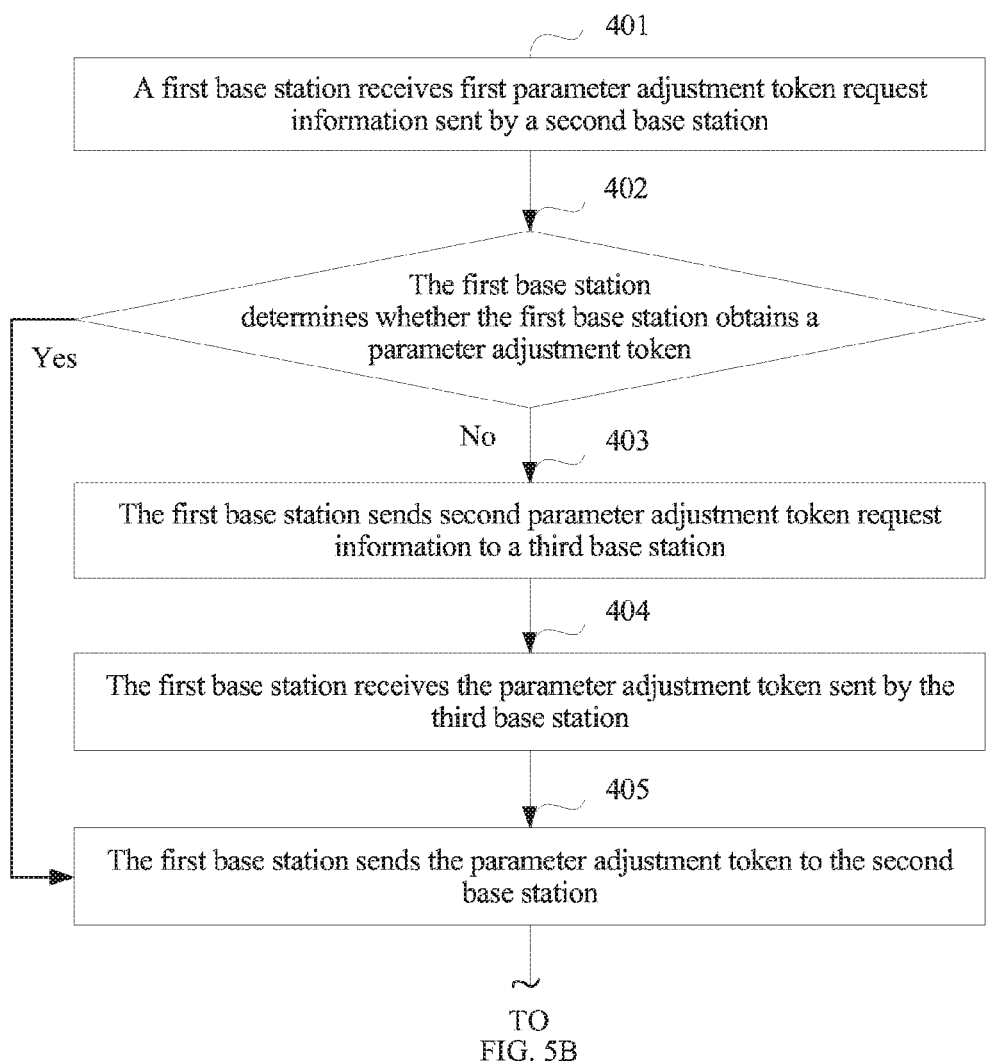

FIG. 5A and FIG. 5B are a schematic flowchart of a network parameter adjustment method according to Embodiment 3. The method may be described as follows:

Step 401: A first base station receives first parameter adjustment token request information sent by a second base station.

The first base station is a parent base station of the second base station, and the first parameter adjustment token request information is used to represent that the second base station requests to obtain a parameter adjustment token.

Step 402: The first base station determines whether the first base station obtains a parameter adjustment token. If the first base station obtains the parameter adjustment token, step 405 is performed; or if the first base station does not obtain the parameter adjustment token, step 403 is performed.

An implementation manner of step 402 is the same as an implementation manner of step 301 in Embodiment 2, which is not described in detail herein.

Step 403: The first base station sends second parameter adjustment token request information to a third base station.

The third base station is a parent base station of the first base station, and the second parameter adjustment token request information is used to represent that the first base station requests to obtain the parameter adjustment token.

An implementation manner of step 403 is the same as an implementation manner of step 101 in Embodiment 1, which is not described in detail herein.

Step 404: The first base station receives the parameter adjustment token sent by the third base station.

An implementation manner of step 404 is the same as an implementation manner of step 102 in Embodiment 1, which is not described in detail herein.

Step 405: The first base station sends the parameter adjustment token to the second base station.

In step 405, if the first base station device receives first parameter adjustment token request information sent by multiple second base stations, the first base station device sends, according to a time at which first parameter adjustment token request information sent by each second base station is received, the received parameter adjustment token to a second base station that earliest sends first parameter adjustment token request information.

Alternatively, if the first base station device receives first parameter adjustment token request information sent by multiple second base stations, the first base station device sends, according to token request strength carried in received first parameter adjustment token request information sent by each second base station, the received parameter adjustment token to a second base station with the highest token request strength.

The token request strength is used to represent network performance after a base station that requests the parameter adjustment token adjusts a network parameter when obtaining the parameter adjustment token.

Step 406: Convert the first base station into a child base station of the second base station when the first base station sends the parameter adjustment token to the third base station.

Step 407: When needing the parameter adjustment token, the first base station sends third parameter adjustment token request information to the second base station.

The third parameter adjustment token request information is used to represent that the first base station requests to obtain the parameter adjustment token.

Step 408: The first base station receives the parameter adjustment token sent by the second base station.

Step 409: The first base station adjusts a network parameter when receiving the parameter adjustment token.

Embodiment 4

Figure 6:
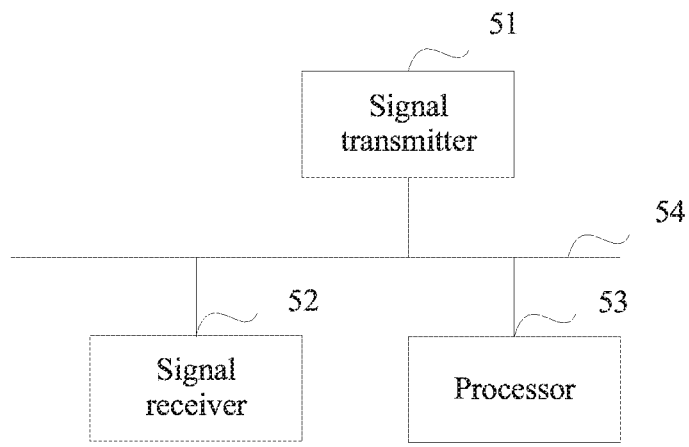
FIG. 6 is a schematic structural diagram of a base station device according to Embodiment 4.

FIG. 6 is a schematic structural diagram of a base station device according to Embodiment 4. The base station device has a function of executing Embodiment 1 to Embodiment 3. The base station device may use a structure of a general-purpose computer system; and the computer system may be specifically a processor-based computer. The base station device entity includes a signal transmitter 51, a signal receiver 52, and at least one processor 53. The signal transmitter 51, the signal receiver 52, and the at least one processor 53 are connected to each other by using a bus 54.

The processor 53 may be a general-purpose central processing unit (CPU), a microprocessor, an application-specific integrated circuit (ASIC), or one or more integrated circuits that are configured to control program execution of the solution.

The base station device is a first base station of multiple base stations, the multiple base stations share one parameter adjustment token, and only a base station that obtains the parameter adjustment token can adjust a network parameter.

The signal transmitter 51 is configured to send first parameter adjustment token request information to a second base station of the multiple base stations, where the second base station is a parent base station of the first base station, and the first parameter adjustment token request information is used to represent that the first base station requests to obtain the parameter adjustment token.

The signal receiver 52 is configured to receive the parameter adjustment token sent by the second base station.

The processor 53 is configured to adjust a network parameter after the parameter adjustment token is received.

Specifically, the signal transmitter 51 is specifically configured to send the first parameter adjustment token request information to the second base station when the network parameter needs to be adjusted and the parameter adjustment token is not obtained.

The processor 53 is further configured to convert the first base station into a parent base station of the second base station after the parameter adjustment token sent by the second base station is received.

The signal receiver 52 is further configured to receive second parameter adjustment token request information sent by a third base station, where the first base station is a parent base station of the third base station, and the second parameter adjustment token request information is used to represent that the third base station requests to obtain the parameter adjustment token.

The processor 53 is specifically configured to determine, according to the second parameter adjustment token request information after the parameter adjustment token is received, whether to reserve the parameter adjustment token; and adjust a network parameter when determining to reserve the parameter adjustment token, or send the parameter adjustment token to the third base station when determining not to reserve the parameter adjustment token.

The processor 53 is specifically configured to determine to reserve the parameter adjustment token and adjust a network parameter when a time at which the signal transmitter sends the first parameter adjustment token request information is earlier than a time at which the signal receiver receives the second parameter adjustment token request information sent by the third base station.

The processor 53 is specifically configured to determine to reserve the parameter adjustment token and adjust a network parameter when token request strength of the first base station is greater than token request strength of the third base station that is carried in the received second parameter adjustment token request information.

The token request strength is used to represent network performance after a base station that requests the parameter adjustment token adjusts a network parameter when obtaining the parameter adjustment token.

When needing to adjust a network parameter, a base station device requests a parameter adjustment token from a parent base station of the base station device, which means that the base station device obtains the parameter adjustment token, that is, the base station device obtains permission to adjust a network parameter, and can adjust a network parameter of the base station device. This achieves an objective that, at a time, only one base station in a base station cluster has the permission to adjust a network parameter, and effectively avoids a problem that signal interference is strengthened because multiple base stations in the base station cluster simultaneously adjust a network parameter, thereby improving system performance.

Embodiment 5

Figure 7:
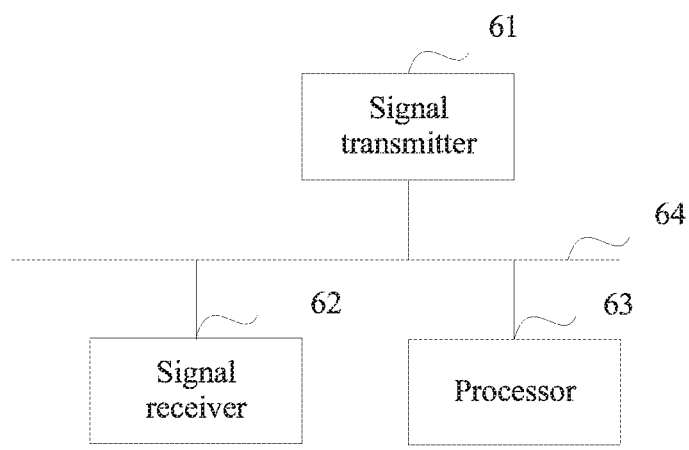
FIG. 7 is a schematic structural diagram of a base station device according to Embodiment 5.

FIG. 7 is a schematic structural diagram of a base station device according to Embodiment 5. The base station device has a function of executing Embodiment 1 to Embodiment 3. The base station device may use a structure of a general-purpose computer system; and the computer system may be specifically a processor-based computer. The base station device entity includes a signal transmitter 61, a signal receiver 62. The signal transmitter 61 and the signal receiver 62 are connected to each other by using a bus 64.

The base station device is a first base station of multiple base stations, the multiple base stations share one parameter adjustment token, and only a base station that obtains the parameter adjustment token can adjust a network parameter.

The signal receiver 62 is configured to receive first parameter adjustment token request information sent by a second base station, where the first base station is a parent base station of the second base station, and the first parameter adjustment token request information is used to represent that the second base station requests to obtain the parameter adjustment token.

The signal transmitter 61 is configured to send second parameter adjustment token request information to a third base station of the multiple base stations when the parameter adjustment token is not obtained, where the third base station is a parent base station of the first base station, and the second parameter adjustment token request information is used to request to obtain the parameter adjustment token.

The signal receiver 62 is further configured to receive the parameter adjustment token sent by the third base station.

The signal transmitter 61 is further configured to send the parameter adjustment token to the second base station, so that the second base station can adjust a network parameter when receiving the parameter adjustment token.

Optionally, the base station device further includes a processor 63.

The processor 63 is configured to convert the first base station into a child base station of the second base station after the parameter adjustment token is sent to the second base station.

The signal transmitter 61 is specifically configured to: earliest receive first parameter adjustment token request information sent by the second base station; and send the received parameter adjustment token to the second base station.

The signal transmitter 61 is specifically configured to: receive the first parameter adjustment token request information sent by the second base station, where the first parameter adjustment token request information carries the highest token request strength; and send the received parameter adjustment token to the second base station, where the token request strength is used to represent network performance after a base station that requests the parameter adjustment token adjusts a network parameter when obtaining the parameter adjustment token.

The signal transmitter 61 is further configured to send third parameter adjustment token request information to the second base station after the first base station is converted into the child base station of the second base station, where the third parameter adjustment token request information is used to represent a request for obtaining the parameter adjustment token.

The signal receiver 62 is further configured to receive the parameter adjustment token sent by the second base station.

The processor 63 is further configured to adjust a network parameter after the parameter adjustment token sent by the second base station is received.

The processor 63 may be a general-purpose central processing unit (CPU), a microprocessor, an application-specific integrated circuit (application-specific integrated circuit, ASIC), or one or more integrated circuits that are configured to control program execution of the solution.

Embodiment 6

Figure 8:
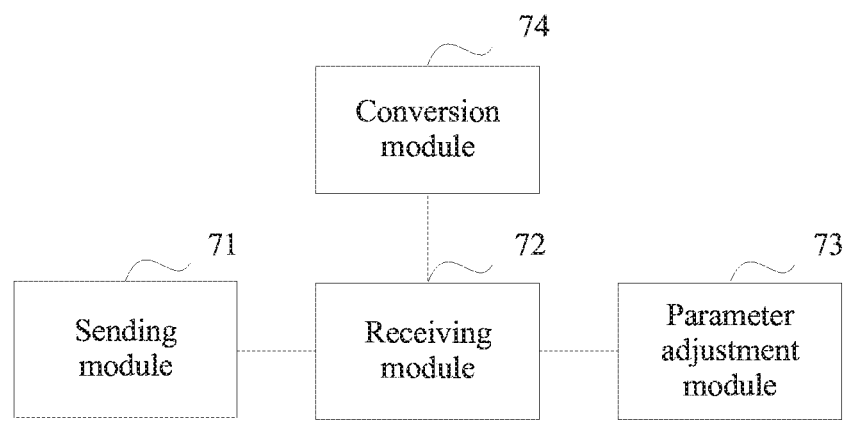
FIG. 8 is a schematic structural diagram of a network parameter adjustment device according to Embodiment 6.

FIG. 8 is a schematic structural diagram of a network parameter adjustment device according to Embodiment 6.

A base station in which the network parameter adjustment device is located is a first base station of multiple base stations, the multiple base stations share one parameter adjustment token, and only a base station that obtains the parameter adjustment token can adjust a network parameter. The network parameter adjustment device includes a sending module 71, a receiving module 72, and a parameter adjustment module 73.

The sending module 71 is configured to send first parameter adjustment token request information to a second base station of the multiple base stations, where the second base station is a parent base station of the first base station, and the first parameter adjustment token request information is used to represent that the first base station requests to obtain the parameter adjustment token.

The receiving module 72 is configured to receive the parameter adjustment token sent by the second base station.

The parameter adjustment module 73 is configured to adjust a network parameter after the receiving module receives the parameter adjustment token.

Specifically, the sending module 71 is specifically configured to send the first parameter adjustment token request information to the second base station when the network parameter needs to be adjusted and the parameter adjustment token is not obtained.

The network parameter adjustment device further includes a conversion module 74.

The conversion module 74 is configured to convert the first base station into a parent base station of the second base station after the parameter adjustment token sent by the second base station is received.

The receiving module 72 is further configured to receive second parameter adjustment token request information sent by a third base station, where the first base station is a parent base station of the third base station, and the second parameter adjustment token request information is used to represent that the third base station requests to obtain the parameter adjustment token.

The parameter adjustment module 73 is specifically configured to determine, according to the second parameter adjustment token request information after the parameter adjustment token is received, whether to reserve the parameter adjustment token; and adjust a network parameter when determining to reserve the parameter adjustment token, or trigger the sending module when determining not to reserve the parameter adjustment token.

The sending module 71 is further configured to send the parameter adjustment token to the third base station.

The parameter adjustment module 73 is specifically configured to determine to reserve the parameter adjustment token and adjust a network parameter when a time at which the signal transmitter sends the first parameter adjustment token request information is earlier than a time at which the signal receiver receives the second parameter adjustment token request information sent by the third base station.

The parameter adjustment module 73 is specifically configured to determine to reserve the parameter adjustment token and adjust a network parameter when token request strength of the first base station is greater than token request strength of the third base station that is carried in the received second parameter adjustment token request information.

The token request strength is used to represent network performance after a base station that requests the parameter adjustment token adjusts a network parameter when obtaining the parameter adjustment token.

It should be noted that the network parameter adjustment device involved in this embodiment may be a module integrated into a base station, or may be a logic component inside the base station, which is not limited herein.

Embodiment 7

Figure 9:
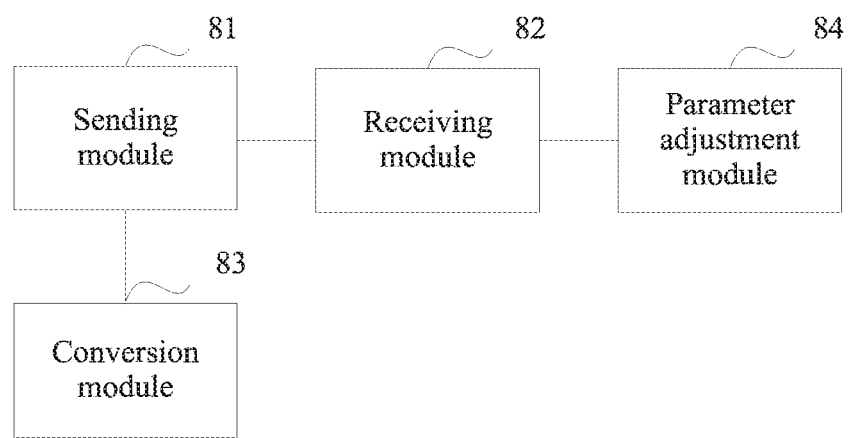
FIG. 9 is a schematic structural diagram of a network parameter adjustment device according to Embodiment 7.

FIG. 9 is a schematic structural diagram of a network parameter adjustment device according to Embodiment 7.

A base station in which the network parameter adjustment device is located is a first base station of multiple base stations, the multiple base stations share one parameter adjustment token, and only a base station that obtains the parameter adjustment token can adjust a network parameter. The device includes a sending module 81 and a receiving module 82.

The receiving module 82 is configured to receive first parameter adjustment token request information sent by a second base station, where the first base station is a parent base station of the second base station, and the first parameter adjustment token request information is used to represent that the second base station requests to obtain the parameter adjustment token.

The sending module 81 is configured to send second parameter adjustment token request information to a third base station of the multiple base stations when the parameter adjustment token is not obtained, where the third base station is a parent base station of the first base station, and the second parameter adjustment token request information is used to request to obtain the parameter adjustment token.

The receiving module 82 is further configured to receive the parameter adjustment token sent by the third base station.

The sending module 81 is further configured to send the parameter adjustment token to the second base station, so that the second base station can adjust a network parameter when receiving the parameter adjustment token.

Optionally, the network parameter adjustment device further includes a conversion module 83.

The conversion module 83 is configured to convert the first base station into a child base station of the second base station after the parameter adjustment token is sent to the second base station.

The sending module 81 is specifically configured to: earliest receive first parameter adjustment token request information sent by the second base station; and send the received parameter adjustment token to the second base station.

The sending module 81 is specifically configured to receive the first parameter adjustment token request information sent by the second base station, where the first parameter adjustment token request information carries the highest token request strength; and send the received parameter adjustment token to the second base station, where the token request strength is used to represent network performance after a base station that requests the parameter adjustment token adjusts a network parameter when obtaining the parameter adjustment token.

Optionally, the network parameter adjustment device further includes a parameter adjustment module 84.

The sending module 81 is further configured to send third parameter adjustment token request information to the second base station after the first base station is converted into the child base station of the second base station, where the third parameter adjustment token request information is used to represent a request for obtaining the parameter adjustment token.

The receiving module 82 is further configured to receive the parameter adjustment token sent by the second base station.

The parameter adjustment module 84 is configured to adjust a network parameter after the parameter adjustment token sent by the second base station is received.

It should be noted that the network parameter adjustment device involved in this embodiment may be a module integrated into a base station, or may be a logic component inside the base station, which is not limited herein.

A person skilled in the art should understand that the embodiments may be provided as a method, an apparatus (device), or a computer program product. Therefore, the present embodiments may use a form of hardware only embodiments, software only embodiments, or embodiments with a combination of software and hardware. Moreover, the present embodiments may use a form of a computer program product that is implemented on one or more computer-usable storage media (including but not limited to a disk memory, a CD-ROM, an optical memory, and the like) that include computer-usable program code.

The present embodiments are described with reference to the flowcharts and/or block diagrams of the method, the apparatus (device), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments have been described, persons skilled in the art can make changes and modifications to these embodiments once they learn the basic inventive concept. Therefore, the following claims are intended to be construed as to cover the preferred embodiments and all changes and modifications falling within the scope.

Obviously, a person skilled in the art can make various modifications and variations to the present embodiments without departing from the spirit and scope of the present embodiments. The present embodiments are intended to cover these modifications and variations provided that they fall within the scope of protection defined by the following claims and their equivalent technologies.

What is claimed is:

1. A base station device comprising:
a processor; and
a non-transitory computer readable storage medium storing a program for execution by the processor, the program including instructions to:
send first parameter adjustment token request information to a second base station, wherein the base station device is a first base station of multiple base stations, wherein the second base station is one of the multiple base stations, wherein the multiple base stations share a parameter adjustment token, wherein only base stations that obtain the parameter adjustment token are able to adjust a network parameter, wherein the second base station is a parent base station of the first base station, and wherein the first parameter adjustment token request information represents a request by the first base station to obtain the parameter adjustment token;
receive the parameter adjustment token sent by the second base station;
adjust a network parameter after the parameter adjustment token is received;
receive second parameter adjustment token request information sent by a third base station, wherein the first base station is a parent base station of the third base station, and the second parameter adjustment token request information represents that the third base station requests to obtain the parameter adjustment token;
determine, according to the second parameter adjustment token request information, after the parameter adjustment token is received, whether to reserve the parameter adjustment token;
adjust a network parameter in response to determining to reserve the parameter adjustment token; and
send the parameter adjustment token to the third base station in response to determining not to reserve the parameter adjustment token.

2. The base station device according to claim 1, wherein the instructions further comprise instructions to convert the first base station into a parent base station of the second base station after the parameter adjustment token is received.

3. The base station device according to claim 1, wherein the instructions further comprise instructions to:
determine to reserve the parameter adjustment token; and
adjust a network parameter in response to a time at which the base station device sends the first parameter adjustment token request information being earlier than a time at which the base station device receives the second parameter adjustment token request information sent by the third base station.

4. The base station device according to claim 1, wherein the instructions further comprise instructions to:
reserve the parameter adjustment token; and
adjust a network parameter in response to a token request strength of the first base station being greater than a token request strength of the third base station that is carried in the received second parameter adjustment token request information,
wherein the token request strength represents network performance after a base station that requests the parameter adjustment token adjusts a network parameter while obtaining the parameter adjustment token.

5. A base station device comprising:
a processor; and
a non-transitory computer readable storage medium storing a program for execution by the processor, the program including instructions to:
receive first parameter adjustment token request information sent by a second base station, wherein the base station device is a first base station of multiple base stations, wherein the multiple base stations share a parameter adjustment token, wherein only base stations that obtain the parameter adjustment token are able to adjust a network parameter, wherein the first base station is a parent base station of the second base station, and wherein the first parameter adjustment token request information represents a request by the second base station to obtain the parameter adjustment token;
send second parameter adjustment token request information to a third base station of the multiple base stations in response to the parameter adjustment token not being obtained, wherein the third base station is a parent base station of the first base station, and the second parameter adjustment token request information requests to obtain the parameter adjustment token;
receive the parameter adjustment token sent by the third base station;
send the parameter adjustment token to the second base station, requesting that the second base station adjust a network parameter;
receive the first parameter adjustment token request information sent by the second base station, wherein the first parameter adjustment token request information carries a highest token request strength; and
send the received parameter adjustment token to the second base station, wherein the token request strength represents a network performance, after a base station that requests the parameter adjustment token adjusts a network parameter while obtaining the parameter adjustment token.

6. The base station device according to claim 5, wherein the instructions further comprise instructions to convert the first base station into a child base station of the second base station after the parameter adjustment token is sent to the second base station.

7. The base station device according to claim 5, wherein the instructions further comprise instructions to:
send third parameter adjustment token request information to the second base station after the first base station is converted into a child base station of the second base station, wherein the third parameter adjustment token request information represents a request for obtaining the parameter adjustment token;
receive the parameter adjustment token sent by the second base station; and
adjust a network parameter after the parameter adjustment token sent by the second base station is received.

8. A method comprising:
sending, by a first base station, first parameter adjustment token request information to a second base station of multiple base stations, wherein the first base station is one of the multiple base stations, wherein the multiple base stations share a parameter adjustment token, wherein only base stations that obtain the parameter adjustment token are able to adjust a network parameter, wherein the second base station is a parent base station of the first base station, and wherein the first parameter adjustment token request information represents a request by the first base station to obtain the parameter adjustment token;
receiving, by the first base station, the parameter adjustment token sent by the second base station; and
adjusting, by the first base station, the network parameter after receiving the parameter adjustment token, wherein adjusting the network parameter specifically comprises:
receiving, by the first base station, second parameter adjustment token request information sent by a third base station, wherein the first base station is a parent base station of the third base station, and the second parameter adjustment token request information represents that the third base station requests to obtain the parameter adjustment token;
determining, by the first base station, according to the second parameter adjustment token request information, whether to reserve the parameter adjustment token, after receiving the parameter adjustment token;
adjusting a network parameter in response to determining to reserve the parameter adjustment token; and
sending the parameter adjustment token to the third base station in response to determining not to reserve the parameter adjustment token.

9. The method according to claim 8, further comprising converting the first base station into a parent base station of the second base station after the receiving the parameter adjustment token.

10. The method according to claim 8, wherein adjusting the network parameter comprises:
determining to reserve the parameter adjustment token; and
adjusting the network parameter in response to a time at which the first base station sends the first parameter adjustment token request information being earlier than a time at which the first base station receives the second parameter adjustment token request information sent by the third base station.

11. The method according to claim 8, wherein adjusting the network parameter comprises:
determining, by the first base station, to reserve the parameter adjustment token; and
adjusting a network parameter in response to a token request strength of the first base station being greater than a token request strength of the third base station that is carried in the received second parameter adjustment token request information, wherein the token request strength represents network performance after a base station that requests the parameter adjustment token adjusts a network parameter while obtaining the parameter adjustment token.

12. A method comprising:
receiving, by a first base station, first parameter adjustment token request information sent by a second base station, wherein the first base station is one of multiple base stations, wherein the multiple base stations share a parameter adjustment token, wherein only base stations that obtain the parameter adjustment token are able to adjust a network parameter, wherein the first base station is a parent base station of the second base station, and wherein the first parameter adjustment token request information represents a request by the second base station to obtain the parameter adjustment token;

sending, by the first base station, second parameter adjustment token request information to a third base station of the multiple base stations, in response to not obtaining the parameter adjustment token, wherein the third base station is a parent base station of the first base station, and the second parameter adjustment token request information requests to obtain the parameter adjustment token;

receiving, by the first base station, the parameter adjustment token sent by the third base station; and sending, by the first base station, the parameter adjustment token to the second base station, requesting that the second base station adjust a network parameter, in response to receiving the parameter adjustment token, wherein sending the parameter adjustment token comprises:

receiving, by the first base station, the first parameter adjustment token request information sent by the second base station, wherein the first parameter adjustment token request information carries a highest token request strength; and sending the received parameter adjustment token to the second base station, wherein the token request strength represents network performance, after a base station that requests the parameter adjustment token adjusts a network parameter while obtaining the parameter adjustment token.

13. The method according to claim 12, wherein the method further comprises:

converting the first base station into a child base station of the second base station after the first base station sends the parameter adjustment token to the second base station.

14. The method according to claim 12, wherein the method further comprises:

sending, by the first base station, third parameter adjustment token request information to the second base station after the first base station is converted into a child base station of the second base station, wherein the third parameter adjustment token request information represents a request for obtaining the parameter adjustment token;

receiving, by the first base station, the parameter adjustment token sent by the second base station; and adjusting, by the first base station, the network parameter, after receiving the parameter adjustment token sent by the second base station.

\* \* \* \* \*